INVENTORS.
HANS KLETSCHKE
HELLMUT SCHNEGGENBURGER
HANS MACHOLDT

BY *James E. Bryan*
ATTORNEY.

3,278,092
APPARATUS FOR THE REGULATED DISCHARGE OF MATERIALS UNDER PRESSURE
Hans Kletschke, Wiesbaden-Biebrich, Hellmut Schneggenburger, Wiesbaden, and Hans Macholdt, Wiesbaden-Biebrich, Germany, assignors to Kalle Aktiengesellschaft, Wiesbaden-Biebrich, Germany, a corporation of Germany
Filed Dec. 7, 1964, Ser. No. 416,342
Claims priority, application Germany, Dec. 12, 1963, K 51,611
4 Claims. (Cl. 222—368)

This invention relates to an apparatus for the regulated discharge of gaseous, liquid and/or solid substances from chambers in which superatmospheric pressures exist.

Devices for discharging liquids and solids from chambers are known whose discharge members comprise perforated discs or rotating pistons provided with axially disposed apertures. Bucket wheels provided with special seals are also used for this purpose. In the pulp industry, devices are used for charging and discharging digesters in which a perforated shaft rotates in a housing which is either bored to receive it or in which sealing is effected by means of sealing rings in the surface of the housing.

However, these known devices are very restricted as regards the field of use thereof. Furthermore, they can not be sealed to a degree sufficient to make them suitable for discharging liquids and/or solids or especially highly volatile gases from chambers in which high pressures exist.

The present invention provides an apparatus for the regulated discharge of gaseous, liquid and/or solid substances from a chamber in which superatmospheric pressure exists, the apparatus comprising, arranged for continuous rotation in a pressure-resistant housing provided with an inlet opening for connection to the chamber and an outlet opening, a shaft having a central section which is provided with at least one bored recess or borehole, the arrangement being such that a substance as specified can pass thereinto from the inlet opening and be discharged therefrom through the outlet opening, the said central section of the shaft being otherwise sealed off from the outlet opening and/or the inlet opening by means of a seal member or members each of which is provided with a borehole and each seal member being rigidly mounted in a guide which is capable of resilient movement along an axis perpendicular to the surface of the central shaft section, with sealing means capable of resilient movement being disposed between the guide and the interior of the housing.

The aforementioned drawbacks are obviated to a large extent by the apparatus of the invention.

The shaft is mounted in bearings disposed in the housing at each end, the bearings being designed to withstand the operating pressures; they are sealed off from the outside by stuffing boxes of conventional design. The diameter of the central section of the shaft is advantageously greater than that of the lengths of shaft on either side. The central section is preferably cylindrical and each recess or borehole is radially or diametrically disposed therein and is coaxial with the inlet and outlet openings when in register therewith and, together with the openings, is of cylindrical form of the same diameter. In other embodiments, each recess or borehole may be larger or smaller in diameter than the inlet and outlet openings.

The surface of the central section and, in most cases, of the smaller extensions thereof, must be especially wear-resistant and may be made from steel that has been case-hardened by one of the known nitriding processes, for example, by the so-called Sulf-Inuz process or the so-called soft nitriding process.

The outlet zone into which the outlet opening discharges is generally in communication with the atmosphere. The sealing member is provided with a surface the curvature of which corresponds to that of the central section of the shaft. The sealing member also should have good anti-friction properties. It also should be wear-resistant to a degree commensurate with the requirements of the specific operation for which the apparatus is to be used. Furthermore, the degree of friction between the seal member and the shaft central section should be as low as possible. It is preferable that the material from which the seal member is made should have a lower degree of wear-resistance than the central section. The seal member may be made of metal, a metal alloy or, for example, a synthetic inorganic or, in particular, organic material, for example a laminated fabric impregnated with a phenolic resin, or sintered polytetrafluoroethylene, or some other synthetic material. The synthetic materials may contain a variety of substances to improve their anti-friction and wear-resistant properties, for example molybdenum sulfide, glass powder, graphite or copper.

The seal member, which is rigidly seated in the guide, is, as stated, capable of resilient movement along the axis thereof and is pressed against the central section of the shaft. The pressure may be exerted by springs, but preferably by hydraulic means. In order to make possible the resilient axial movement of the seal member and guide and at the same time seal off the space containing the medium supplying the hydraulic pressure or the springs from the interior of the housing, the seal member guide is connected to the housing by a suitable pressure-resistant sealing means which permits resilient reciprocatory movement. Devices suitable for this purpose are, for example, conventional packing elements that may either be disposed between the seal member guide and the housing or be compressed therebetween by a gland. However, it is preferred to use a corrugated metal membrane; for example, it may be in the form of simple corrugated sheet metal or in the form of a bellows. Devices of this kind serve to evenly distribute the wear of the seal member, which depends upon the friction between the seal member and the central shaft section, and the pressure between the seal member and the shaft.

In general, it is sufficient for either the outlet opening or the inlet opening in the housing to be sealed by a seal member as specified. However, if there is a great difference in pressure between the two sides of the central section it may be advantageous to provide both the outlet and the inlet openings with seal assemblies as described.

Using the apparatus of the invention, it is possible to discharge gases, liquids, suspensions and solids in portions from a chamber in which a high pressure exists into a chamber in which a lower pressure exists, for example, atmospheric pressure, the apparatus being specially suitable for emptying pressure chambers in which reactions are carried out continuously.

The difference in pressure between the two chambers may be substantial, for example of the order of several hundred atmospheres. The upper limit of pressure is fixed solely by the strength of the material used for fabricating the components of the apparatus and the stability of the substance to be discharged. The apparatus may also be sealed to a degree such that it is capable of discharging highly volatile gases. Depending upon operating conditions, the apparatus can have an operating period of several hundred hours.

When the parts that are subjected to a certain degree of wear are well manufactured, the pressure with which the seal member is forced against the central section of the shaft need only be slightly above that existing in the chamber containing the material to be discharged.

The discharge of liquid and solid substances from the pressure chamber by means of a central section provided with bored recesses depends solely on gravity. When discharging gases, the force of gravity is reinforced by the expansion of the gas in the recesses. The amount discharged can be controlled by the speed at which the shaft rotates. In the case of central shaft sections provided with a borehole extending completely therethrough, the discharge of gaseous, liquid and solid substances depends primarily on the difference in pressure between the pressure chamber and the vessel into which the substance is to be discharged and to only a small degree on the force of gravity.

The invention is further illustrated in the accompanying drawings in which.

Figure 1:
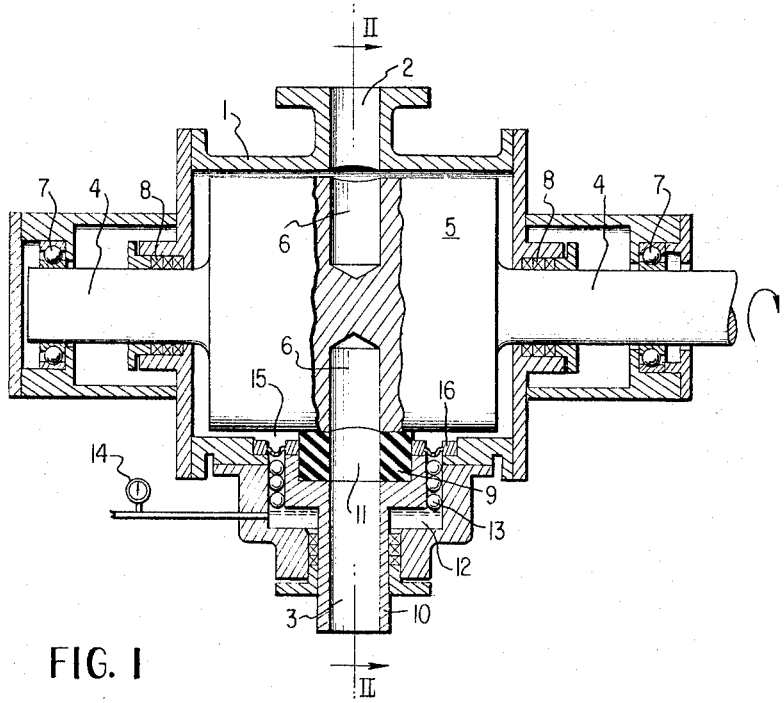
FIGURE 1 is a longitudinal elevation partly in section.
Figure 2:
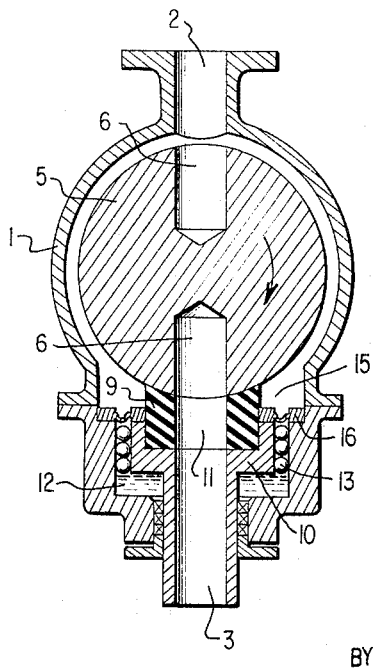
FIGURE 2 is a section on the line II—II of FIGURE 1.

Referring to the drawing, a shaft comprising a central section 5, provided with two bored recesses 6 disposed opposite one another, and bounding sections 4 of smaller diameter, is rotatably mounted in a pressure-resistant housing 1 provided with an inlet opening 2 and an outlet opening 3. The sections 4 of the shaft are mounted in the bearings 7 designed to withstand the pressures existing during operation and are sealed off from the exterior by the stuffing boxes 8. The center section 5 is sealed off from the outlet opening 3 by means of a seal member 9 which is capable of resilient movement along its axis and which is seated in a guide member 10. The seal member 9 and guide 10 are provided with a bore 11 having the same diameter as the bored recesses 6 and producing a passage from these recesses to the outlet opening 3, which is also of the same diameter, and thence into a receiving chamber, not shown. The seal member 9 is pressed against the center section of the shaft by means of a hydraulic press 12. A slide bearing 13, which may comprise sliding boxes or roller bearings, permits an easy axial movement of the guide 10 and the seal member 9. A measuring instrument 14 indicates the pressure with which the seal member 9 is forced against the center section 5. The hydraulic press 12 is sealed off from the interior of the housing 15 by means of an annular corrugated metal membrane 16 which is attached on one side to the guide 10 of the seal member 9 and on the other to the housing 1.

The seal member alternatively may be mounted on the other side of the center section of the shaft in front of the inlet opening 2 or a second seal member may be so mounted.

It will be obvious to those skilled in the art that many modifications may be made within the scope of the present invention without departing from the spirit thereof, and the invention includes all such modifications.

What is claimed is:

1. An apparatus for the regulated discharge of material from a chamber in which superatmospheric pressure exists comprising a housing having inlet and outlet openings therein, a cylindrical shaft rotatably mounted in the housing and having at least one bore therein adapted to be alternately aligned with the inlet and outlet openings in the housing during rotation of the shaft, and sealing means for sealing at least one of the inlet and outlet openings against the surface of the shaft, said sealing means including a guide which is movable in a direction perpendicular to the surface of the shaft.

2. An apparatus according to claim 1 in which the sealing means is biased against the surface of the shaft by hydraulic means.

3. An apparatus according to claim 1 in which the sealing means includes a flexible seal between the guide and the housing.

4. An apparatus according to claim 1 in which a seal is mounted in the guide and contacts the surface of the shaft.

References Cited by the Examiner

UNITED STATES PATENTS

| | | | |
|---|---|---|---|
| 2,921,721 | 1/1960 | Brooks | 222—368 |
| 2,985,340 | 5/1961 | Vogt | 222—194 X |
| 3,052,383 | 9/1962 | Franseau | 222—368 |
| 3,101,853 | 8/1963 | Long et al. | 222—368 X |
| 3,130,879 | 4/1964 | Messing | 222—368 |

ROBERT B. REEVES, *Primary Examiner.*

LOUIS J. DEMBO, HADD S. LANE, *Examiners.*